Nov. 5, 1963

F. FALLA 3,109,359

COOKING UTENSIL

Filed July 14, 1961

INVENTOR.
FERNANDO FALLA
BY
ATTORNEY

Nov. 5, 1963 F. FALLA 3,109,359
COOKING UTENSIL
Filed July 14, 1961 3 Sheets-Sheet 2

INVENTOR
FERNANDO FALLA
BY
ATTORNEY

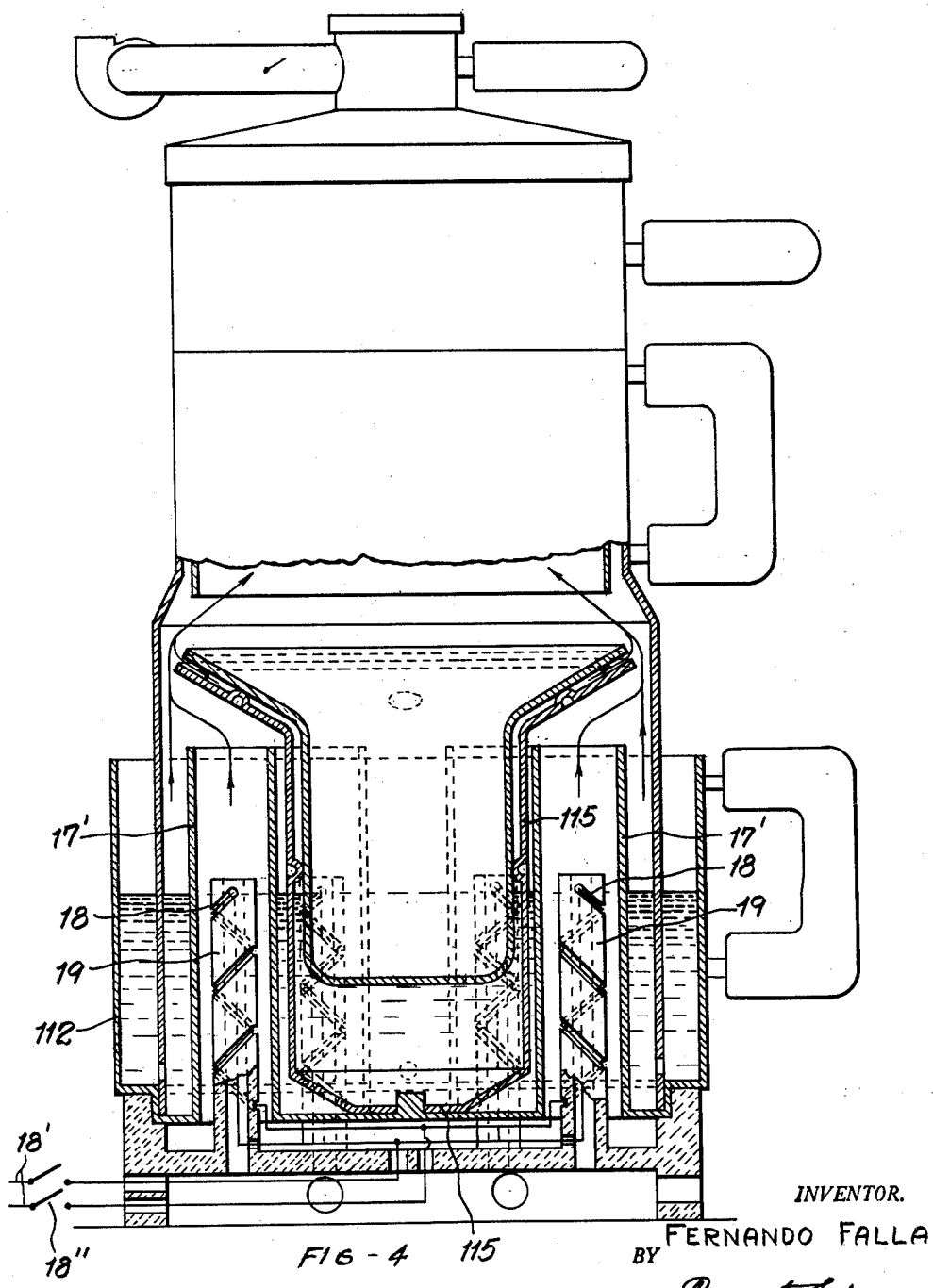

United States Patent Office 3,109,359
Patented Nov. 5, 1963

3,109,359
COOKING UTENSIL
Fernando Falla, 59 Elm St., Millburn, N.J.
Filed July 14, 1961, Ser. No. 124,090
7 Claims. (Cl. 99—339)

The invention relates to apparatus for the cooking of food, more particularly to the provision of means for the simultaneous preparation of a plurality of food items, such as in the cooking of a complete meal—from meat to vegetables—in one unit.

Heretofore, in the use of conventional apparatus for this purpose, it has been the practice just to expose the foods to flames, or to heating (incandescent) elements.

It is an object of the present invention to provide a novel and highly efficient process of, and apparatus for, effecting cooking with a source of heat such as an open flame or electrical heating means—in the former case, to a mixture of hot products of combustion and steam, and in the latter, to a mixture of heated air and steam.

As to the former mixture, this is more adequate for the proper cooking, as it affords a substantially moist gas—combustion gases and steam—the latter component including steam from the combustion of hydrogen. Thus, the specific heat of such mixture is between 0.28—specific heat of gas—and 0.50—specific heat of steam at atmospheric pressure. The resultant mixture may thus have a specific heat of approximately 0.39; and the cooking will be substantial and accelerated. Furthermore, the temperature of the mixture can be maintained at from 500° F. to 700° F. for the initial cooking. This is effected by selecting the required water level in the cooker. For example, a high water level in the cooker will serve to cool the combustion gases further and to generate more steam—which latter, however, will then remain at approximately 212° F. at sea level.

On the other hand, with a low level of water in the cooker, the steam will cool the gases less, which, in turn, will cause smaller quantities of steam to be generated. It is therefore possible to start with either a hot gas mixture, of about 700° F. (more or less); or, with a mixture at a lower temperature, for example, 500° F. (more or less). Thus a lower temperature gas mixture will contain more steam with a correspondingly higher specific heat—a condition most desirable for best and satisfactory cooking.

The arrangement, moreover, is such that the various food items are in superposed (stack) relationship with the cooking gaseous mixture introduced at the lower portion.

A further object of the invention is to guide or to so conduct the application of heat (stack arrangement) that it will be distributed uniformly to the various items and so control the degree of cooking of the food.

Still another object of the invention is to provide a construction of cooker whereby grease drippings are readily disposed of.

The invention has for an object, also, to channel a mixture of steam and heated air, or steam products of combustion, to food in order to secure intimate contact therewith.

Still another object of the invention is to afford a cooking process wherein objectionable odors are eliminated; and, particularly, escape of grease fumes into the ambient atmosphere is obviated, for example, by condensation thereof.

With the novel apparatus, also, it is possible to prepare a substantially complete meal in a single unit, and effect rapidly the cooking of the same.

To this end, there is created a stack-like flow of the aforesaid gaseous mixture, at adequate temperatures; and in which mixture a substantial proportion of steam exists—the mixture being applied directly to the food to be cooked, as well as indirectly.

It is possible, also, to prepare in one operation with the novel cooking apparatus, a substantially complete meal and to effect the same rapidly. Thus the said unit to this end comprises a plurality of vertically-disposed and superimposed, nested food retainers which are designed for association with suitable heat-developing means. The arrangement is such that heated air and/or products of combustion are directed upwardly through a vessel containing water to mix with the resulting water vapor therefrom for subsequent delivery of the mixture over the food.

Moreover, removable drip-collecting means are provided beneath the food containers and within the water-containing vessel to collect, for subsequent disposal, melted fats dripped therein during the cooking operation—the arrangement being such as to insure against overheating of said collected material to prevent carbonization thereof.

The novel construction and assembly of the cooker, moreover, insures ready cleaning of the same when a cooking operation has been completed.

The nature of the invention, however, will best be understood when described in connection with the accompanying drawings, in which:

FIG. 4 is an elevational view, partly in vertical section, of the novel cooker; and illustrates a modification in the arrangement for applying the heat.

Figure 1:
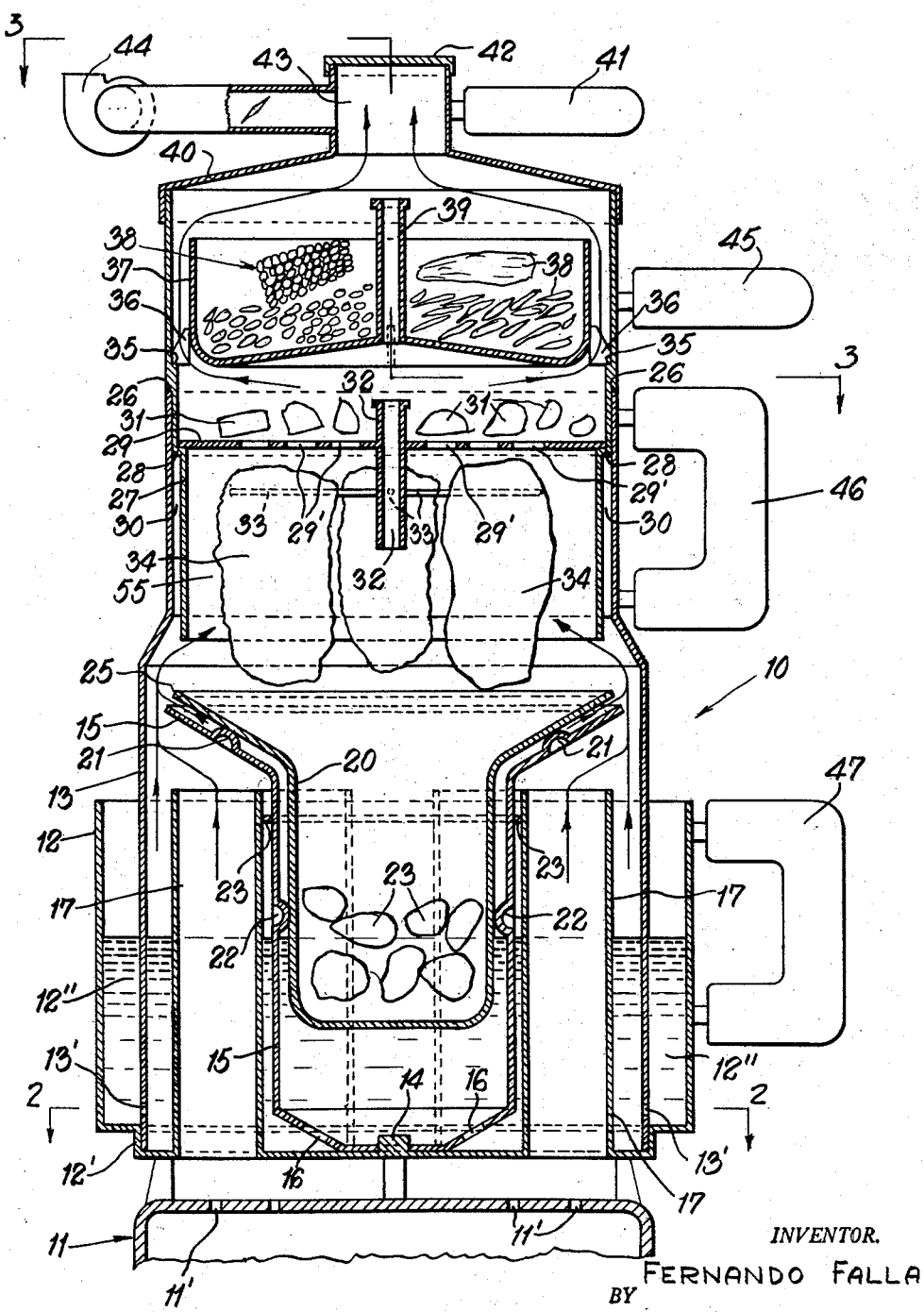
FIG. 1 is a vertical section through the cooker apparatus and burner heating means associated therewith.
Figure 2:
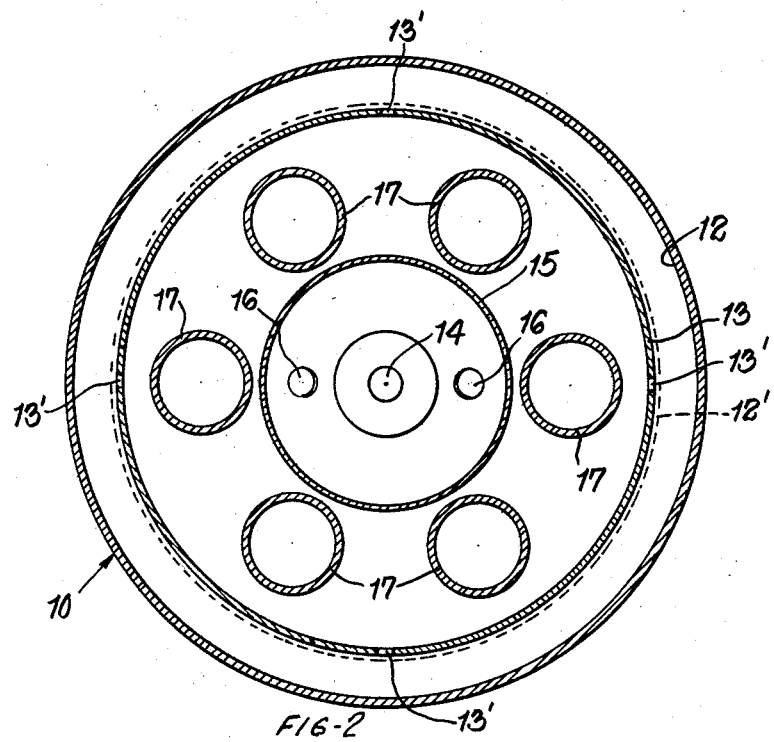
FIG. 2 is a horizontal section through the lower portion of the cooker, taken on the line 2—2, FIG. 1.
Figure 3:
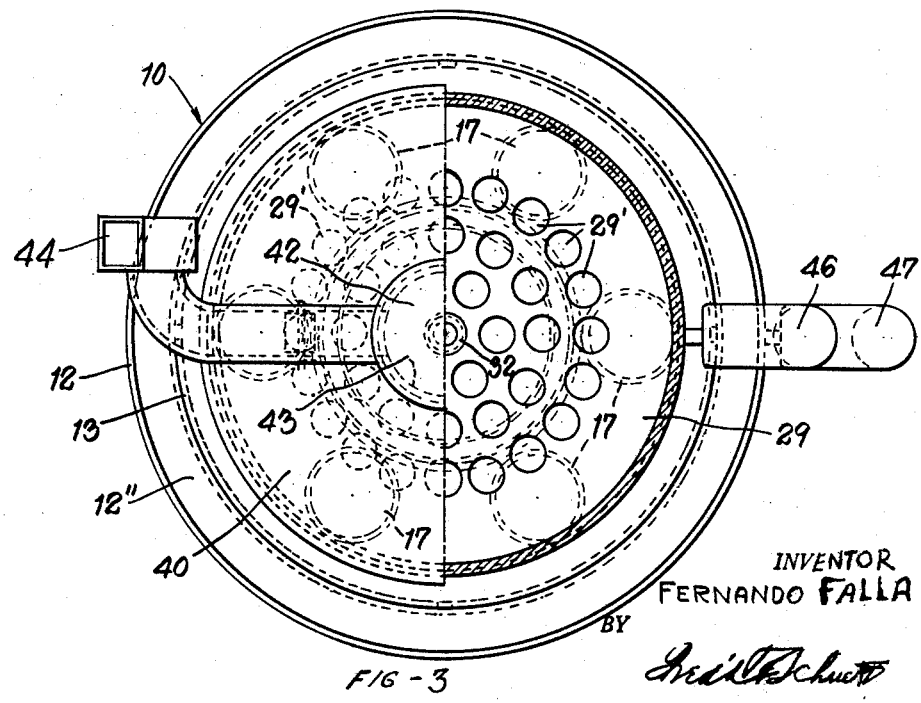
FIG. 3 is a part plan view and horizontal section, the latter being taken on the line 3—3, FIG. 1.

Referring to the drawings, more particularly to FIG. 1 thereof, the novel unit 10—which is to be associated for use in the conventional manner with suitable heating means such as a gas burner 11, provided with burner openings 11′, or the like—comprises an open-top, water-retaining vessel 12. As shown, this vessel is, for example, of a cylindrical shape with its lowermost portion somewhat reduced in diameter to afford a circular shoulder 12′. The latter is designed to locate and seat, removably and coaxially within the vessel, a jacket member 13 adapted for the support of food-retaining members, as will hereinafter be more fully set forth. At its lower end, the jacket member is provided with perforations 13′ for water circulation throughout the vessel when the jacket member is in place for service. At such time, there will thus be provided about its immersed end a shell 12″ of water.

Axially positioned within the vessel 12, and removably seated over an upwardly-extending, centrally-disposed bottom and locating projection or stud 14 thereof, is a second water-retaining vessel 15—peripheral openings 16 being provided in the frusto-conical bottom termination for affording communication with water contained in the said water-retaining vessel 12.

Passing upwardly through the said vessel 12, and between its wall and that of the said vessel 15, are circularly arranged tubular members or flues 17, which form part of the said water vessel 12, and which project, preferably, slightly beyond the rim of the said vessel 12, as is indicated. In the operation of the novel unit, these tubular members are to be juxtaposed to the burner openings 11′ of the burner 11—spent gases mixing then above vessel 12 with water vapor therefrom and vessel 15, as is indicated by the merging arrows.

This mixture then continues upwardly for application to the food which is to located at different levels, as hereinafter more fully set forth.

Instead of utilizing a gas burner as the means for supplying the heat required for the cooking operations, electrical coils 18, FIG. 4, may be provided, the same being energized from a suitable source of power, such as the electrical mains 18' and under control of a switch 18", as is well understood. These coils then extend upwardly into the respective open-ended tubes 17' of the water-retaining vessel 112; and are wound upon tubular, open-ended supports 19 communicating at the lower end with the atmosphere, as shown. The air within the tubes or flues 17', heated thereby, flows upwardly then to combine with the water vapor from the vessels 112 and 115—as is indicated by the arrows—similarly to the action of the previously described embodiment.

Within the aforesaid water-retaining vessel 15, FIG. 1, and displaced axially upwardly from its bottom, is nested a removable drip collector and/or food-retaining vessel 20, which, together with its surrounding vessel 15, is extended beyond the top edges of the respective tubular flues 17 and also flares outwardly to extend thereover together with the correspondingly outwardly-flared top of the vessel 15.

The outward dimensions of the said vessels 15 and 20 are such that said tops will extend beyond the tops of the flues 17 and thus permit grease droppings from food suspended above the same to fall into the said vessel 20.

Upon withdrawal of the jacket member 13, the vessel 20 is readily removable from its associated vessel 15, being supported from the inner surface thereof through circularly disposed inward indentations 21, 22. An upper centering ring 23 of the said vessel 15, furthermore, serves to locate it coaxially with respect to the surrounding flues 17.

With the aforesaid arrangement, the water vapors generated within the said vessels 12 and 15 will follow coaxial paths as is indicated, in the case of the latter, by the arrows between the vessels 15 and 20—joining beyond the top of the latter vessel. In this manner, also, the grease-collecting portions of the vessel 20 will be maintained substantially at the boiling temperature of the water in vessel 15.

Food, such as onions 23 retained by the vessel 20 may be cooked therein together with other edible products; and any resulting drippings will serve to brown the same—surplus dripplings descending into the bottom of vessel 20 for their subsequent collection.

As shown, the tubular jacket member 13 extends upwardly beyond the flaring top of the vessel 20, being reduced to a diameter slightly less than that of the rim 25 of said flaring top of the vessel 20. Rim 26 of said jacket member is designed to support co-axially a tubular foot-retaining member such as the inwardly-stepped, open-ended cylinder 27. This cylinder, intermediate its ends, is provided with an external, circular shoulder or ledge 28 which in designed to receive and support a perforated food-retaining disk 29. Furthermore, the said open-ended cylinder 27 is reduced in diameter at its lower portion to an extent such that it provides with the reduced-diameter, upper-end portion of the jacket member 13, an annular, heat-insulating cylindrical space 30 of air for reducing radiation from the internal cooking chambers.

The said cylinder 27, also, prevents grease of the cook-foods from falling outside the vessels 15 and 20.

Such food, for example, pieces of potatoes 31, may then be supported by the perforated, removable disk 29 which is, furthermore, provided with an axial, tubular post 32. The latter extends upwardly therefrom to afford means for manipulating said disk; and below the same to carry radially-directed, pointed spikes 33, upon which chunks of meat 34 are impaled for cooking thereof by the mixture of ascending gases from the tubes 17 and water vapor arising from water vessels 12 and 15, as is indicated by the arrows.

In order to ascertain the temperature prevailing, a thermometer (not shown) may be inserted through tube 32. Also, as the disk 29 is perforated, as at 29', further food items such as the pieces of potatoes 31, for example, may be cooked thereon.

The uppermost portion of the cylinder 27, which extends to the top of the cooker, is provided with an intermediate inner ledge 35 for seating spacer-supports 36 of an additional container 37 designed to receive further food such as, for example, vegetables 38. This container is similarly provided with an axial tubular post 39 for manipulation of the said container, as well as for insertion of a thermometer (not shown), the two containers being coaxially disposed within the cooker.

The upper end of post 39 extends, also, above the upper top edge of container 37, thus preventing any water formed by condensation of steam as well as that contained in vegetables 38 from falling into said post 39.

The top of the cylinder 27 may be closed by a cover member 40 which is designed to be fitted manually thereover, as by manipulation of a handle member 41 which is attached thereto—a removable vent cap 42 being fitted over its outlet 43; or, connection may be made to exhausting means 44, as shown. Similarly a handle 45 is attached to the cylinder 27, and a handle 46 to the jacket member 13. Still another handle 47 serves for the manipulation of the water-retaining vessel 12.

As a specific example of the cooking operation by means of the said novel cooking apparatus, it is to be noted that it is desirable, first, to dispose the different types of food in a predetermined order vertically. Thus, meats—which have, generally, substantial amounts of fat subject to melting in the course of the cooking—are to be suspended at the lowermost portion of the cooking region in the path of the ascending hot gaseous mixture, as is indicated by the arrows.

In order to load the cooker for the usual preparation, the water vessel 12 is first filled to a level such as will be somewhat below the upper ends of the flues 17. This prevents the foaming of the water into said flues 17, should violent ebullition occur. The vessel 15 and drip collector 20 are then inserted, the latter containing, for example, onions 23 which are to be cut into small pieces and duly seasoned prior to their introduction. Thereupon, the jacket 13 is inserted into position, followed by the open-ended cylinder 27. The perforated disk 29 is then lowered by its post 32 and seated on the ledge 28.

The said post 32 carries chunks of meat 34, as indicated, the same being impaled on the spikes 33 of the said post. Also, the potatoes 31 may be placed upon the perforated disk 29.

It is noted that the perforations 29' of the disk 29 are grouped about its post 32, whereby the heated gaseous mixture entering the meat chamber will be caused to sweep over the suspended chunks of meat 34 and will leave axially upwardly about the said post.

The container 37 is then placed in position and carries, for example, vegetables 38 such as peas, lima beans, string beans, etc.; also, corn and carrots, as is indicated.

Since all of the evegetables contain considerable moisture, it is not necessary to add any water—steam condensation furnishing not only the required heat but all necessary water for transfer of heat. However, for best results, there is to be added to the vegetables 38 a lump of butter and some salt and pepper for seasoning.

The cover 40 is then to be placed over the top of the cooking unit.

Initially, when firing takes place, the hot gases rise to follow the path indicated by the arrows—no steam being raised, however, and the gas temperature consequently at the chamber 55 would be approximately 800° F. and gradually falling to 600° F. as the moisture becomes mixed therewith. Thus, the meat has become fully seared before the cooking takes place.

Once the boiling of the water is fully established, the temperature of the gaseous mixture is established. As the water continues to boil the water level gradually becomes lower and the temperature of the gaseous mixture rises. This condition is very beneficial for the best performance of the utensil as such condition guarantees the best cooking on the container 37, and the smell from the gaseous mixture passing out of cover 40 tells the exact condition of the meats broiling at 34.

Normally, about 25 minutes firing is required for completion of the cooking of a complete meal, as of the nature set forth.

It is to be noted that any grease or oil fumes that may pass through perforations 29' and potatoes 31 will come in contact with the bottom of additional container 37 and condense there and be guided by the conical bottom of 37 to the side so that such condensates will eventually fall into drip collector cup 20. This feature of the invention eliminates grease fumes into the surrounding atmosphere, the kitchen walls will be free from grease.

I claim:

1. A cooking utensil consisting of an open topped vessel adapted to hold water having within a plurality of vertical tubular flues circularly disposed and defining a central inner space, said flues being open at both ends to permit the passage of heated gases to the interior of the utensil; a drip collecting assembly comprising two similarly shaped cups, removably fitted in said inner space, both said cups having cylindrical lower sections and upwardly flaring conical rims, one of said cups being removably fitted within the other of said cups so that the bottom portion of the inner cup is approximately at one-half the height of the vertical flues to prevent said inner cup from floating when the vessel is filled with water, the flared conical rims of both said cups being of sufficient diameter so as to overly the open ends of said flues to prevent food drippings from entering said flues; a cylindrical jacket member positioned between the flues and the side of the open topped vessel and resting on the bottom of the said vessel, and extending upwardly above the upper ends of said flues so as to enclose said flues, said jacket member having upper and lower portions, the lower portion having a diameter greater than the diameter of the rims of said cups to allow passage of the heated gases and steam, the upper portion of the jacket member having a diameter less than the diameter of the rims of said cups so as to direct food drippings to the grease collecting assembly, the lower portion of said jacket further having perforations therein to permit communication of the water in said vessel on either side of said jacket; a cylindrical food supporting member nestably supported by said jacket and having sections of three different diameters, the lowermost of said sections having a diameter less than that of the upper portion of said jacket to form a thermal insulating gap, the uppermost of said sections having a diameter substantially equal to that of the upper portion of said jacket and extending upwardly above said jacket to form a cooking compartment; and a cover member having a central gas outlet adapted to receive a removable vent cap and a side outlet for alternative connecting to a gas exhausting means.

2. A cooking utensil according to claim 1 including a perforated food supporting disc removably supported by the lower section of said food supporting member and having a central tubular member extending above and below, whereby the upper end of said tubular member serves as a handle and the lower end serves as a food support by means of horizontal spikes thereon.

3. A cooking utensil according to claim 1 including a cup shaped food container supported in the upper section of said food supporting member by means of lugs formed thereon, said container having a bottom formed conically upwardly towards its center and having a vertical tube extending above the rim of said container.

4. A cooking utensil according to claim 1 having handles attached to the open topped vessel, the jacket member, the food supporting member, and the cover member.

5. A cooking utensil consisting of an open topped vessel adapted to hold water and having therein a plurality of vertical tubular flues circularly disposed and defining a central inner space, said flues being open at both ends to permit the passage of heated gases therethrough, at least one drip collecting cup removably seated within said central space having an outwardly flaring rim overlying the upper ends of said flues, an open ended jacket member seated on the bottom of said vessel between its wall and the flues, a food supporting member supported by the upper end of said jacket member and being of a diameter substantially equal to that of the rim of said drip collecting cup so that all drippings from food supported by said food supporting member will be directed to said grease cup, and cover means for said food supporting member having a gas outlet adapted to receive a removable vent cap, and side outlet for alternative connection to a gas exhausting means.

6. A cooking utensil according to claim 5 and having a vertical electrical heating coil disposed within each of said flues, said coils being displaced from the walls of said flues sufficiently to permit the passage of heated air therethrough.

7. A cooking utensil according to claim 5 wherein said food supporting member comprises an open cylindrical member having a perforated plate suspended therein, said plate having a central tubular member supporting a plurality of spikes and additionally serving as a handle; and a cup-like container supported by said cylindrical member above said plate.

References Cited in the file of this patent

UNITED STATES PATENTS

| | | |
|---|---|---|
| 710,552 | Amidon | Oct. 7, 1902 |
| 797,660 | Brooks | Aug. 22, 1905 |
| 1,705,822 | Lindsey | Mar. 19, 1929 |
| 1,957,163 | Falla | May 1, 1934 |
| 2,243,093 | Flahive | May 27, 1941 |
| 2,546,163 | McBeth | Mar. 27, 1951 |
| 2,870,028 | Anderson | Jan. 20, 1959 |
| 2,978,325 | Ashley | Apr. 4, 1961 |

FOREIGN PATENTS

| | | |
|---|---|---|
| 371,514 | Great Britain | Apr. 28, 1932 |